United States Patent [19]

Tsuchida

[11] Patent Number: 4,723,638
[45] Date of Patent: Feb. 9, 1988

[54] WHEEL ANGULAR ACCELERATION SENSOR FOR A VEHICLE ANTILOCK CONTROL DEVICE

[75] Inventor: Tetsuo Tsuchida, Saitama, Japan

[73] Assignee: Honda Giken Kogyo Kabushiki Kaisha, Tokyo, Japan

[21] Appl. No.: 944,303

[22] Filed: Dec. 19, 1986

[30] Foreign Application Priority Data

Dec. 20, 1985 [JP] Japan ................. 60-287532

[51] Int. Cl.⁴ .............................................. R60T 8/34
[52] U.S. Cl. ................... 188/181 A; 188/344; 192/4 R; 303/113
[58] Field of Search ............... 303/113–119, 303/2–3,; 188/181 R, 181 A, 181 T, 344, 18 A, 18 R, 180, 184–189; 192/13 R, 12 R, 4 R

[56] References Cited

U.S. PATENT DOCUMENTS

| Re. 31,387 | 9/1983 | Bayliss | 303/115 |
|---|---|---|---|
| 2,818,244 | 12/1957 | Ropar | 264/1 |
| 2,920,924 | 1/1960 | Reswick et al. | 303/24 |
| 3,046,060 | 7/1982 | Stager et al. | 303/21 |
| 3,352,388 | 11/1967 | Lieber | 303/24 R |
| 3,403,761 | 10/1968 | Rockwell | 188/265 |
| 3,731,767 | 5/1973 | Lefort | 188/72.2 |
| 3,908,805 | 9/1975 | Morse et al. | 188/181 A |
| 4,036,331 | 7/1977 | Hayashi et al. | 188/187 |
| 4,046,427 | 9/1977 | Baynes et al. | 303/115 |
| 4,061,212 | 12/1977 | Blomberg | 188/180 |
| 4,225,019 | 9/1980 | Blomberg | 188/181 R |
| 4,260,201 | 4/1981 | Farr | 188/181 A |
| 4,281,881 | 8/1981 | Mekosh et al. | 303/99 |
| 4,340,258 | 7/1982 | Farr | 303/115 |
| 4,350,396 | 9/1982 | Mortimer | 303/115 |
| 4,353,440 | 10/1982 | Farr | 188/181 A |
| 4,377,221 | 3/1983 | Farr | 188/181 A |
| 4,401,348 | 8/1983 | Farr | 303/116 |
| 4,422,695 | 12/1983 | Farr | 303/115 |
| 4,456,309 | 6/1984 | Rath | 303/10 |
| 4,456,310 | 6/1984 | Hayashi et al. | 188/344 X |
| 4,474,413 | 10/1984 | Farr | 303/116 |
| 4,602,705 | 7/1986 | Farr et al. | 188/181 A |
| 4,660,683 | 4/1987 | Hayashi et al. | 192/4 R X |
| 4,664,233 | 5/1987 | Tsuchida et al. | 188/181 A |
| 4,673,221 | 6/1987 | Hayashi et al. | 188/344 X |

FOREIGN PATENT DOCUMENTS

| 55-14295 | 4/1980 | Japan . | |
|---|---|---|---|
| 55-45421 | 11/1980 | Japan . | |
| 57-33052 | 2/1982 | Japan . | |
| 676708 | 7/1952 | United Kingdom . | |
| 778765 | 7/1957 | United Kingdom . | |
| 894577 | 4/1962 | United Kingdom . | |
| 895294 | 5/1962 | United Kingdom . | |
| 1121561 | 7/1968 | United Kingdom . | |
| 1142500 | 2/1969 | United Kingdom . | |
| 1159592 | 7/1969 | United Kingdom . | |
| 1252674 | 11/1971 | United Kingdom . | |
| 1376042 | 12/1974 | United Kingdom . | |
| 1496721 | 12/1977 | United Kingdom . | |
| 2069639 | 2/1981 | United Kingdom | 303/116 |
| 2069641 | 2/1981 | United Kingdom . | |
| 2069642 | 8/1981 | United Kingdom | 188/181 A |
| 2070166A | 9/1981 | United Kingdom . | |
| 2109494 | 6/1983 | United Kingdom . | |
| 2120336 | 11/1983 | United Kingdom . | |

*Primary Examiner*—Douglas C. Butler
*Attorney, Agent, or Firm*—Lyon & Lyon

[57] ABSTRACT

A wheel angular acceleration sensor for a vehicle antilock control device wherein the tendency of the wheel going toward a locked state resulting from an excessively great braking force of the brake applied thereto is detected by overrun rotation of the flywheel and the overrun rotation is converted into an axial displacement of the flywheel by the cam mechanism to output it as a signal for controlling the braking force, the sensor having an aligning mechanism interposed between an output shaft rotated in association with the wheel and the cam mechanism as well as a friction clutch plate for allowing the overrun rotation of the flywheel, whereby when a deflected load is exerted on the cam mechanism or the friction clutch plate due to an error in machining or the like at the time of occurrence of a thrust at the cam mechanism, the aligning mechanism works to overcome the deflected load, allowing the flywheel to displace smoothly and accurately in the axial direction.

11 Claims, 18 Drawing Figures

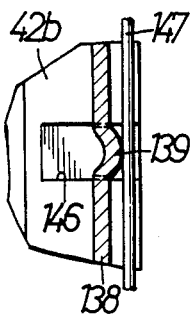
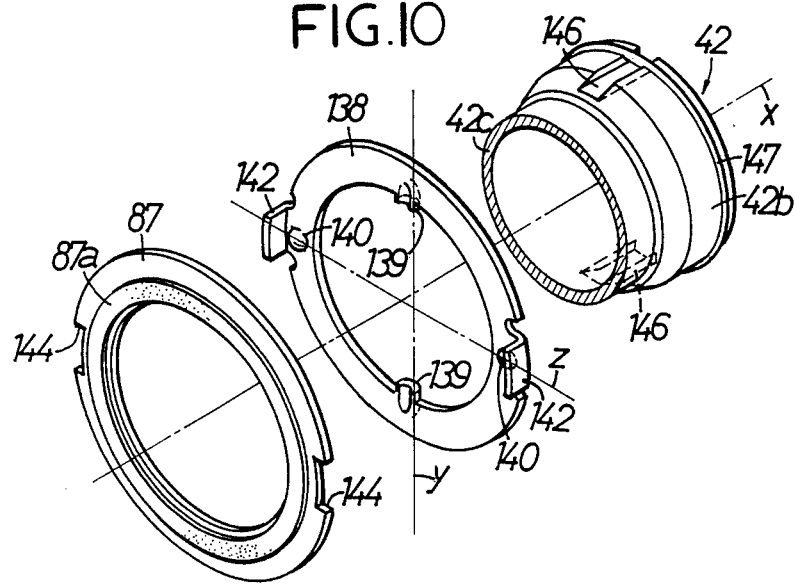

WHEEL ANGULAR ACCELERATION SENSOR FOR A VEHICLE ANTILOCK CONTROL DEVICE

BACKGROUND OF THE INVENTION

1. Field of the Invention

The present invention relates to a wheel angular acceleration sensor for a vehicle anti-lock control device, and particularly, to an improvement in a wheel angular acceleration sensor comprising a flywheel rotatably and slidably supported on an output shaft rotated in association with a wheel braked by a wheel brake, a friction clutch plate which normally transmits a driving torque of the output shaft to the flywheel and which allows overrun rotation of the flywheel when the wheel is about to lock at the braking, and a cam mechanism responsive to the overrun rotation of the flywheel to impart axial displacement thereto, said friction clutch plate and said cam mechanism being interposed in series between said output shaft and said flywheel, said axial displacement of the flywheel being outputted as a signal for controlling a braking force of the wheel brake.

2. Description of the Prior Art

Such a wheel angular acceleration sensor has been already known as described, for example, in Japanese Patent Publication Kokai No. 58-126241.

In conventional angular acceleration sensor, a friction clutch plate is disposed parallel with a plane perpendicularly crossing the axis of an output shaft and is not tiltable relative to that plane. This sometimes brings forth inconveniences in that if a machining error is present in a cam mechanism, when the cam mechanism is operated, an unbalanced load may be exerted between driving and driven cam plates to apply a thrust obliquely, i.e., in an inclined direction relative to the axis of the output shaft, from the cam mechanism to a flywheel to impair smooth axial displacement of the flywheel, and than an unbalanced load may be exerted also to a frictional surface of the friction clutch plate to vary the slip characteristic of the friction clutch plate.

SUMMARY OF THE INVENTION

It is an object of the present invention to provide a wheel angular acceleration sensor of the mentioned type which overcomes these drawbacks as noted above.

For achieving the above-described object, the present invention is characterized in that between the output shaft and the friction clutch plate is interposed an aligning plate for connecting the output shaft and the friction clutch plate in a rotating direction. The aligning plate being provided at one side thereof with a pair of first fulcrum projections placed in abutment with the output shaft so as to enable the tilting of the aligning plate around a first axis perpendicularly crossing an axis of the output shaft and at the other side with a pair of second fulcrum projections abutting against the friction clutch plate so as to enable the tilting of the aligning plate around a second axis perpendicularly crossing both the axis of the output shaft and the first axis.

With this arrangement, when an unbalanced load is exerted to the cam mechanism and the friction clutch plate due to any machining error at the time of generation of a thrust of the cam mechanism, the aligning plate accordingly tilts around the first and second axes perpendicularly crossing the axis of the output shaft and perpendicularly crossing each other, negating the unbalanced load. Accordingly, the flywheel can smoothly displace in the axial direction and the slip characteristic of the friction clutch plate can be stabilized to allow a control signal for the braking force to appear accurately.

Particularly, since the tilting of the aligning plate by the first and second fulcrum projections involves only a very small frictional resistance, unbalanced load can positively be deleted. Moreover, since such aligning plate can be formed to have a very small axial width, the axial length of the acceleration sensor hardly increases, thus not impairing the compactness of the sensor.

BRIEF DESCRIPTION OF THE DRAWINGS

FIG. 1 is a schematic plan view of a motorcycle provided with a braking system having an antilock control device;

FIG. 2 is a longitudinal sectional side view showing essential parts of the braking system;

FIG. 3 is a sectional view taken on line III—III of FIG. 2;

FIG. 4 is a longitudinal sectional view in an enlarged scale of the antilock control device shown in FIG. 3;

FIG. 5 is a sectional view taken on line V—V of FIG. 2;

FIG. 6 is an exploded perspective view showing essential parts of a wheel angular acceleration sensor;

FIGS. 8 through 10 show a second embodiment of the invention wherein

FIG. 8 is a longitudinal sectional view showing parts around the aligning plate of the wheel angular acceleration sensor;

FIG. 9 is a sectional view taken on line IX—IX of FIG. 8;

FIG. 10 is an exploded perspective view showing essential parts of the wheel angular acceleration sensor.

FIGS. 12 through 18 shows a fourth embodiment of the invention in which

FIG. 12 is a sectional view showing essential parts of a braking system similar to that shown in FIG. 3 of the first embodiment;

FIG. 13 is a longitudinal sectional view in an enlarged scale of the antilock control device shown in FIG. 12;

FIG. 14 is an enlarged sectional view showing portions around an accelerating device and a cam shaft;

FIG. 15 is a sectional view taken on line XV—XV of FIG. 13;

FIG. 16 is a sectional view taken on line XVI—XVI of FIG. 15;

FIG. 17 is an exploded perspective view showing essential parts of a wheel angular acceleration sensor; and FIG. 18 is a sectional view taken on line XVIII—XVIII of FIG. 17.

DESCRIPTION OF THE PREFERRED EMBODIMENTS

Embodiments of the present invention will be described with reference to the drawings.

Figure 1:
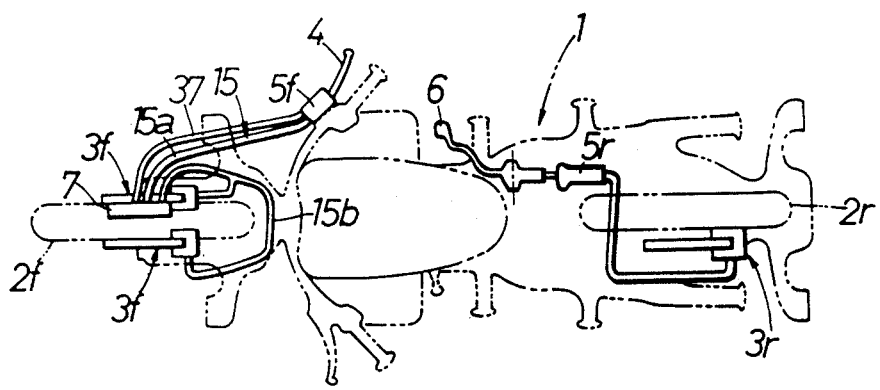
FIGS. 1 through 6 show a first embodiment of the present invention.

A first embodiment of the present invention shown in FIGS. 1 through 6 will be first described. Referring to FIG. 1, a motorcycle 1 comprises a pair of left and right front wheel brakes 3f, 3f for braking a front wheel 2f, and a rear wheel brake 3r for braking a rear wheel 2r, the front wheel brakes 3f, 3f being actuated by output hydraulic oil pressure of a front master cylinder 5f operated by a brake lever 4, the rear wheel brake 2r being actuated by output hydraulic oil pressure of a rear master cylinder 5r operated by a brake pedal 6. Particularly braking hydraulic oil pressure of the front wheel brakes 3f, 3f are controlled by an antilock control device 7.

Figure 2:
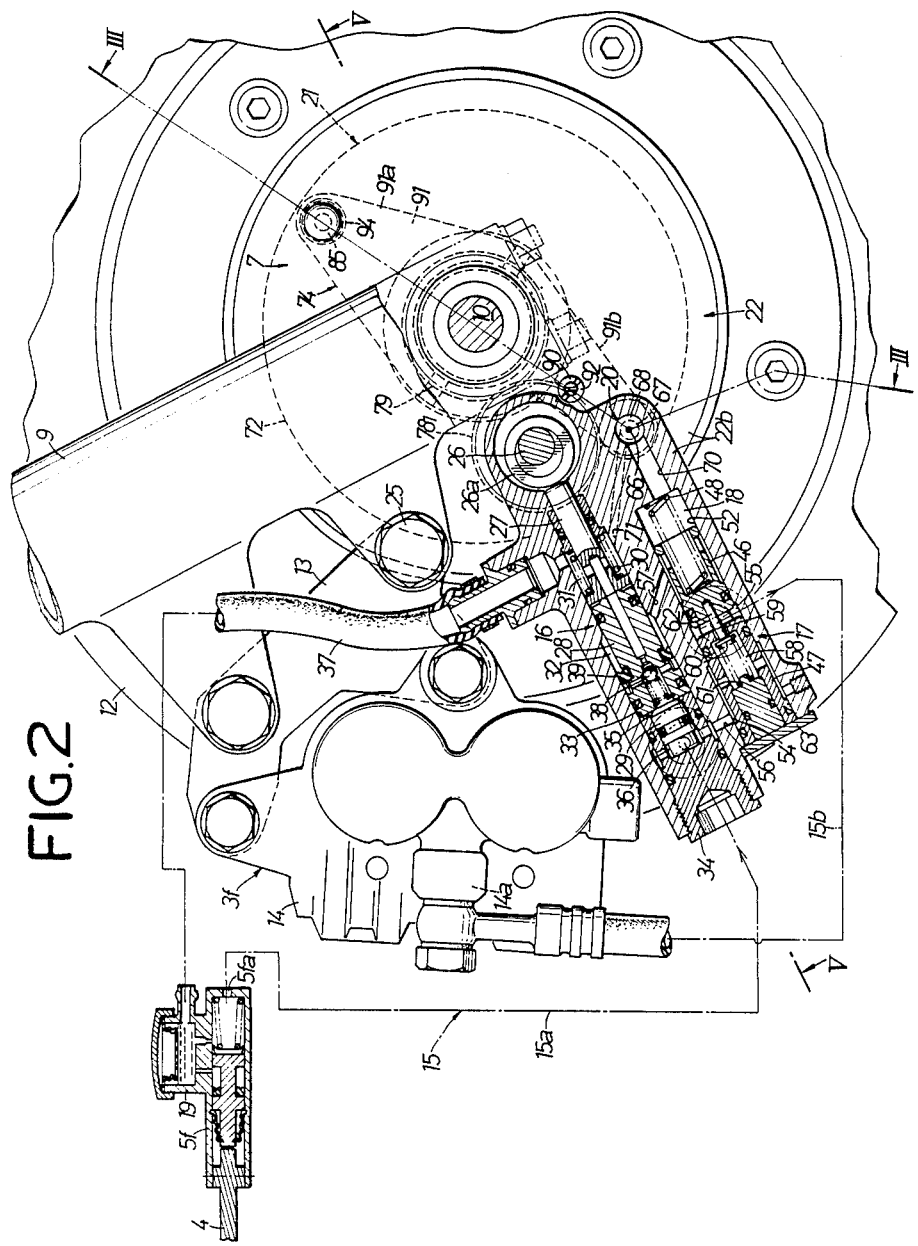
Figure 3:
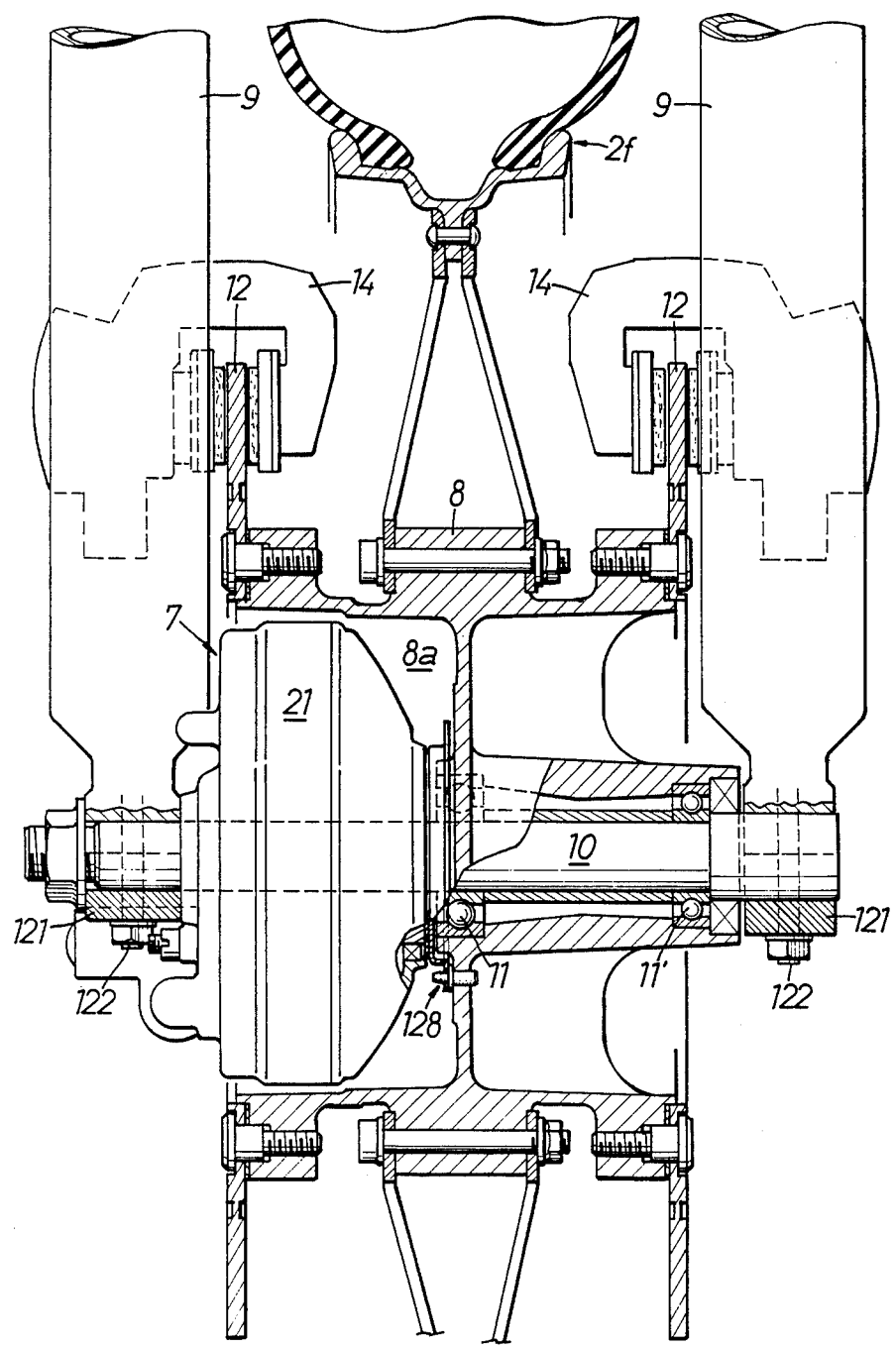
Figure 4:
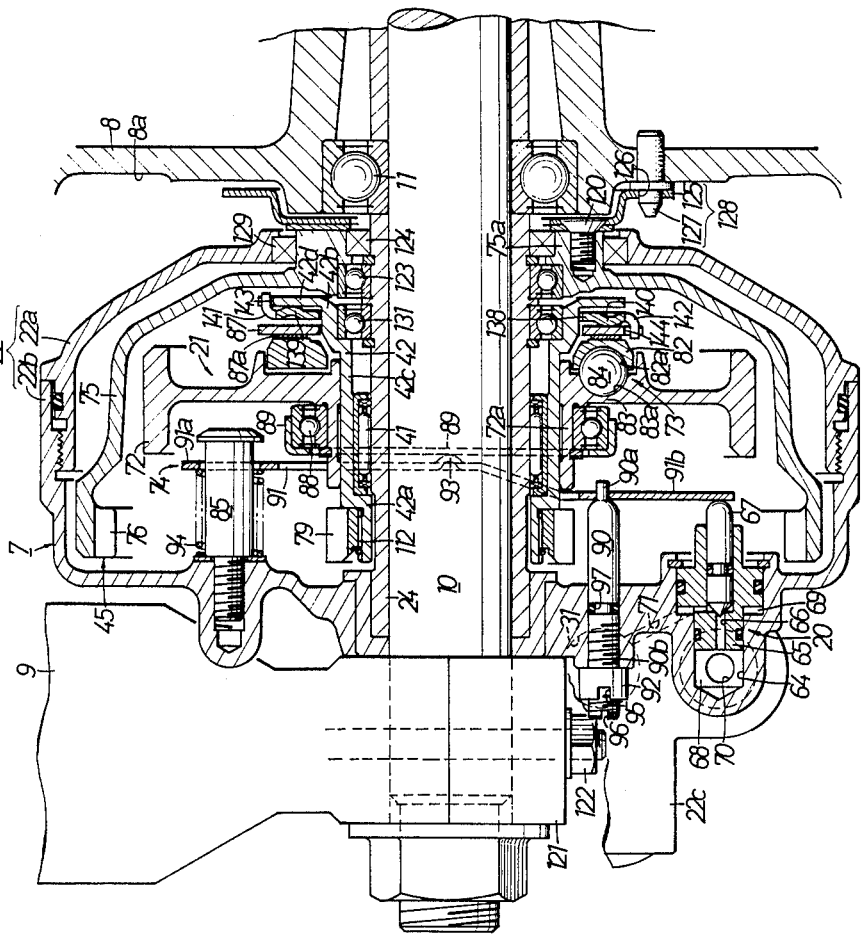

Referring to FIGS. 2 and 3, a hub 8 of the front wheel 2f is rotatably supported on an axle 10 through a pair of bearings 11, 11', the axle 10 having its opposite ends detachably secured to lower ends of a pair of left and right front forks 9, 9 by means of holders 121 and bolts and nuts 122. The pair of front wheel brakes 3f, 3f disposed on both sides of the front wheel 2f each comprise a brake disk 12 secured to an end face of the hub 8 and a brake caliper 14 supported on the front fork 9 through a bracket 13 in a state straddling the brake disk 12. When output hydraulic oil pressure of the front master cylinder 5f is supplied to an input port 14a of the brake caliper 14, the brake caliper 14 actuates to grip the brake disk 12 to apply a braking force to the front wheel 2f.

The antilock control device 7 is interposed in a hydraulic oil pressure conduit 15 as a braking oil passage connecting between an output port 5fa of the front master cylinder 5f and an input port 14a of each brake caliper 14.

Figure 5:
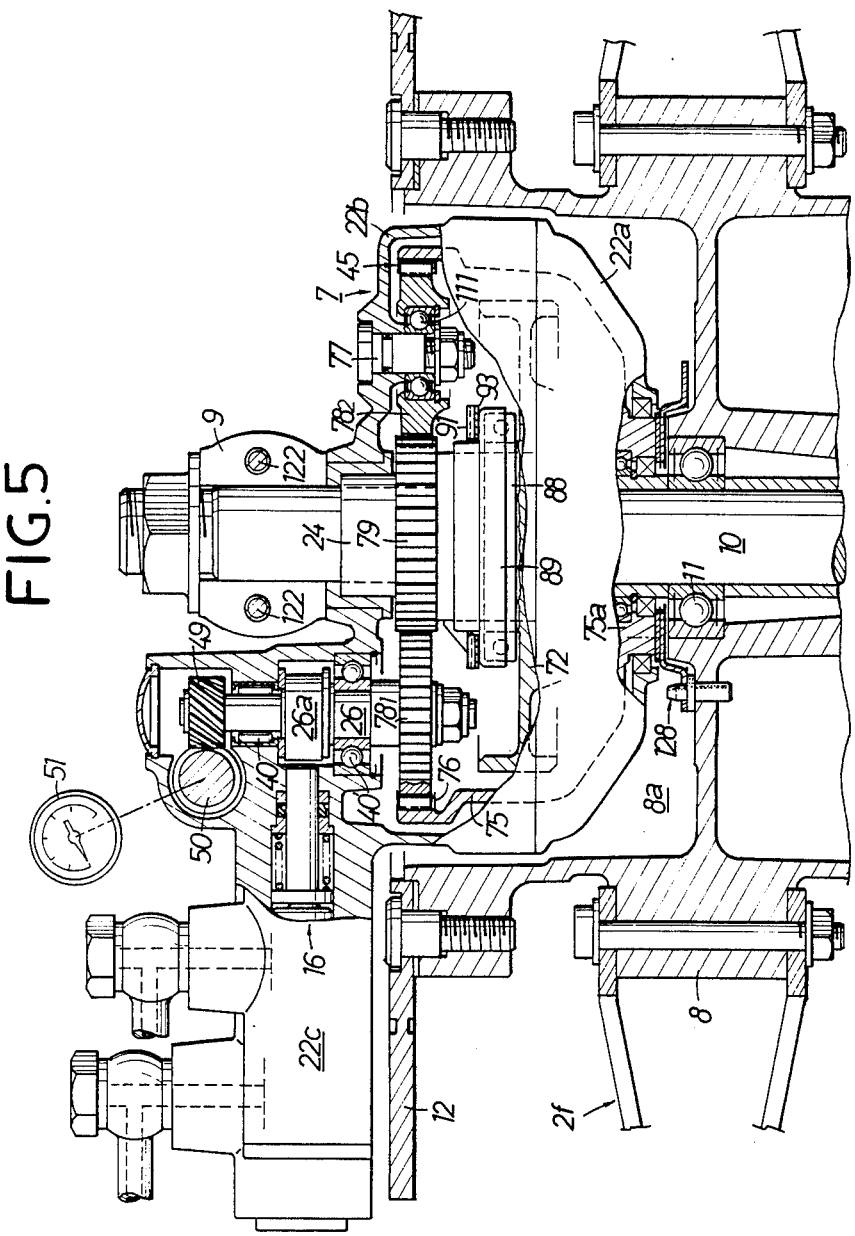

The antilock control device 7 comprises, as principal elements, a hydraulic oil pressure pump 16 operable during braking, a modulator 17 having a control hydraulic oil pressure chamber 18, into which is introduced a discharge pressure of the pump 16, and provided halfway of the conduit 15, a normally closed pressure-discharge valve 20 provided in a communication passage between the chamber 18 and an oil tank 19, and an inertia type wheel angular acceleration sensor 21 for detecting angular deceleration in excess of a predetermined value of the front wheel 2f thereby to open the pressure-discharge valve 20, as shown in FIGS. 2 and 5, these elements being encased in a casing 22.

The casing 22 is constructed such that open ends of a cup-like inner casing 22a and an outer casing 22b are threadedly coupled to each other. The outer casing 22b is integrally formed at an end wall thereof with a radially outwardly extending portion 22c, the casing 22 except said extending portion 22c being disposed so as to be settled in a recess portion 8a formed in the left end of the hub 8. The outer casing 22b has a center portion of its end wall supported on the left end of a tubular shaft 24 fitted around the outer periphery of the axle 10 and is connected to the front fork 9 by a stop means so as not to be rotated around the axle 10. Any suitable stop means can be used but a bolt 25 (see FIG. 2) for securing the bracket 13 to the front fork 9, for example, is suitable.

The hydraulic oil pressure pump 16 comprises a cam shaft 26 disposed parallel to the axle 10, a push rod 27 disposed with the inner end thereof opposed to an eccentric cam 26a formed on the cam shaft 26, a pump piston 28 in abutment with the outer end of the push rod 27, an operating piston 29 in abutment with the outer end of the pump piston 28, and a return spring 30 for urging the push rod 27 in a direction of moving it away from the eccentric cam 26a.

The push rod 27 and the pump piston 28 are slidably fitted in a first cylinder bore 33 formed in the extension 22c to define an inlet chamber 31 and an outlet chamber 32 in the outer peripheries thereof. A plug 34 is fitted in the outer end of the first cylinder bore 33 so as to define a pump chamber 35 between the plug 34 and the pump piston 28, and the aforesaid operating piston 29 is slidably fitted in the plug 34 so as to define a hydraulic oil pressure chamber 36.

The inlet chamber 31 is brought into communication with an oil tank 19 through a conduit 37 and brought into communication with a pump chamber 35 through an intake valve 38. The pump chamber 35 is brought into communication with the outlet chamber 32 through one-way seal member 39 having the function of a discharge valve. The hydraulic oil pressure chamber 36 is connected to an upstream pipe 15a of the conduit 15 so that the chamber 36 may always come into communication with an output port 5fa of the front master cylinder 5f.

As shown in FIG. 5, the cam shaft 26 is supported on the end wall of the outer casing 22b through bearings 40, 40' and is driven by the front wheel 2f through the later-described accelerating gear unit 45.

The cam shaft 26 has a meter driving gear 49 secured to the outer end thereof, and the gear 49 is meshed with a driven gear 50 connected to an input shaft of a speedometer 51 of the motorcycle.

The modulator 17 comprises a pressure reducing piston 46, a fixed piston 47 for receiving one end of the pressure reducing piston 46 to control the limit of backward movement thereof, and a return spring 48 for urging the pressure reducing piston 46 in a direction to abut against the fixed piston 47, both pistons 46 and 47 being slidably fitted in a second cylidner bore 52 formed in the extending portion 22c adjacent the first cylinder bore 33.

In the second cylinder bore 52 the pressure reducing piston 46 defines a control hydraulic oil pressure chamber 18 between the piston 46 and the inner end wall of the second cylinder bore 52 and defines an output hydraulic oil pressure chamber 55 between the piston 46 and the fixed piston 47, and the fixed piston 47 defines an input hydraulic oil pressure chamber 54 around the outer periphery thereof. This input hydraulic oil pressure chamber 54 is brought into communication with the hydraulic oil pressure chamber 36 of the hydraulic oil pressure pump 16 through an oil passage 56, the output hydraulic oil pressure chamber 55 is connected to a downstream pipe 15b of the conduit 15 so that the chamber 55 may always come into communication with the input port 14a of the front wheel brakes 3f, 3f, and the control hydraulic oil pressure chamber 18 is brought into communication with the outlet chamber 32 of the pump 16 through an oil passage 57.

The fixed piston 47 includes a valve chamber 58 always communicating with the input hydraulic oil pressure chamber 54, and a valve hole 59 for bringing the valve chamber 58 into communication with the output hydraulic oil pressure chamber 55, the valve chamber 58 encasing therein a valve body 60 capable of opening and closing the valve hole 59 and a valve spring 61 for urging the valve body 60 toward the closed side. A valve opening rod 62 for pressing the valve body 60 to the open side is projected at one end of the pressure reducing piston 46, the rod 62 maintaining the valve body 60 on open side when the piston 46 is positioned at its limit of backward movement.

An outward opening of the second cylidner bore 52 is closed by an end plate 63 secured to the extending portion 22c, and the fixed piston 47 is always held at a position in abutment with the end plate 63 by the spring force of the return spring 48 or by the oil pressure introduced into the input and output hydraulic oil pressure chambers 54 and 55.

The hydraulic oil pressure pump 16 and the modulator 17 are arranged at the rear of the front fork 9 similarly to the brake caliper 14.

The pressure discharge valve 20 comprises a valve seat member 65 fitted in a stepped cylinder bore 64 of the outer casing 22b and a valve body 67 slidably fitted in the valve seat member 65 to open and close a valve hole 66 in the member 65. The valve seat member 65 defines an inlet chamber 68 at a small diameter portion of the stepped cylinder bore 64 and an outlet chamber 69 at a large diameter portion thereof, both the chambers 68 and 69 being brought into communication with each other through the valve hole 66. The inlet chamber 68 is brought into communication with the control hydraulic oil pressure chamber 18 of the modulator 17 through an oil passage 70, and the outlet chamber 69 is brought into communication with the inlet chamber 31 of the hydraulic oil pressure pump 16 through an oil passage 71. After all, the outlet chamber 69 is in communication with the oil tank 19.

The wheel angular acceleration sensor 21 comprises a flywheel 72 rotated by the front wheel 2f through the accelerating gear unit 45, a cam mechanism 73 for converting overrun rotation of the flywheel 72 into axial displacement, and an output lever mechanism 74 responsive to the axial displacement of the flywheel 72 to actuate the pressure discharge valve 20, these elements being disposed within the casing 22.

The accelerating gear unit 45 comprises a cuplike input mebmer 75 disposed within the casing 22 while orienting the open end thereof at the outer casing 22b, a ring gear 76 formed in the open end of the input member 75, a first planetary gear $78_1$ secured to the inner end of the cam shaft 26 to engage the rear gear 76, one or more second planetary gears $78_2$ supported through a bearing 111 on a support shaft 77 projected on the end wall of the outer casing 22b to engage the ring gear 76, a sun gear 79 simultaneously meshed with the first and second planetary gears $78_1$ and $78_2$, and an output shaft 42 spline-coupled at 112 to the sun gear 79 and rotatably supported on the cylindrical shaft 24.

The secondary planetary gear $78_2$ is provided so that the engagement between the first planetary gear $78_1$ and the ring gear 76 and sun gear 79 is made properly to maintain the coaxial state between the ring gear 76 and the sun gear 79 to secure a positive power transmission by the accelerating gear unit 45. In the case the ring gear 76 and the sun gear 79 are sufficiently high in supporting rigidity, the secondary planetary gear $78_2$ can be excluded.

The input member 75 is formed at the center portion of the end wall thereof with an outwardly projecting boss 75a, which is in turn rotatably supported on the cylndrical shaft 24 through a bearing 123 and a seal member 124.

An inner peripheral portion of a coupling plate 125 is secured to the end of the boss 75a by means of a screw 120. A plurality of engaging holes 126 are bored and arrayed on a circumference in the outer peripheral portion of the coupling plate 125, and a plurality of plastic coupling pins 127 are correspondingly provided on the end face of the hub 8 of the front wheel 2f so that when the cylindrical shaft 24 is fitted on the axle 10, the coupling pins 125 are fitted into the engaging holes 126 of the coupling plate 125 to connect the input member 75 to the hub 8. Accordingly, the coupling plate 125 and the coupling pins 127 constitute a coupling 128.

The coupling pins 127 are formed into taper shape so as to provide smooth fitting thereof into the engaging holes 126, and also have the function of a shear pin which shears upon reception of a rotating torque in excess of a predetermined value.

The boss 75a of input member 75 extends through the inner casing 22a of the casing 22, and a seal member 129 is interposed therebetween to seal the casing 22. The provision of the seal member 129 is effective to minimize the slip speed of the lip portion of the seal member 129 thus prolonging the service life thereof.

The output shaft 42 comprises a small diameter end portion 42a on one end spline-coupled at 112 to the sun gear 79, a large diameter end portion 42b on the opposite end, a shaft portion 42c for connecting both the ends 42a and 42b, and a flange 42d extending radially outwardly from the outer end of the large diameter end portion 42b. The small diameter end portion 42a is arranged at a position adjacent the outer casing 22b. The shaft portion 42c and the large diameter end portion 42b are rotatably supported on the cylindrical shaft 24 through a needle bearing 41 and a ball bearing 131, respectively.

The shaft portion 42c rotatably supports the flywheel 72, which is in turn connected to the flange 42d through the cam mechanism 73, a friction clutch plate 87 and an aligning plate 138.

The cam mechanism 73 comprises an annular driving cam plate 82 encircling the output shaft 42, a driven cam plate 83 integrally formed on the flywheel 72 and opposed to the driving cam plate 82, and a plurality of thrust balls 84 (only one of which is shown) in engagement with a plurality of cam recessed portions 82a, 83a of both the cam plates 82 and 83. In a normal case where the driving cam plate 82 assumes a position on the driving side with respect to the driven cam plate 83, the thrust balls 84 are engaged in deepest portions of the recessed portions 82a and 83a to merely transmit the rotating torque of the driving cam plate 82 to the driven cam plate 83, generating no relative rotation between the cam plates 82 and 83 whereas conversely, when the driven cam plate 83 overruns relative to the driving cam plate 82, relative rotation between the cam plates 82 and 83 occurs so that the thrust balls 84 roll and climb the inclined bottom surfaces of the recessed portions 82a and 83a of both plates to apply the thrust to both the cam plates 82 and 83, whereby the driven cam plate 82 is caused to axially displace away from the driving cam plate 82.

The friction clutch plate 87 is formed annularly and arranged so as to encircle the large diameter end portion 42b of the output shaft 42 of the driving cam plate 82, and a friction lining 87a in engagement with the back of the driving cam plate 82 is provided on the front surface of the plate 87.

Figure 6:
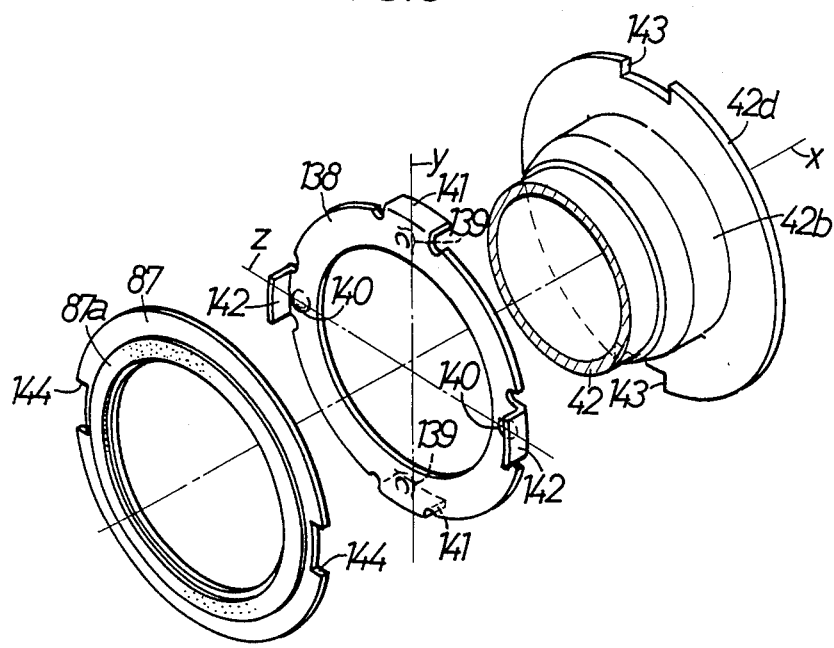

As shown in FIG. 6, the aligning plate 138 has at one side a pair of first flucrum projections 139, 139 in abutment with the flange 42d to enable the tilting of the plate 138 around a first axis y perpendicularly crossing an axis x of the output shaft 42 and has at the other side a pair of second fulcrum projections 140, 140 in abutment with the back of the friction clutch plate 87 to enable the tilting of the plate 138 around a second axis z perpendicularly crossing both the axis x of the output shaft and the first axis y. On the outer periphery of the aligning plate 138 are bent a pair of first transmission pawls 141, 141 projected axially toward the flange 42d adjacent the first fulcrum projections 139, 139 and a pair of second transmission pawls 142, 142 axially projected toward the friction clutch plate 87 adjacent the second fulcrum projections 140, 140. The first transmission pawls 141, 141 are engaged with a pair of notches 143, 143 formed in the outer periphery of the flange 42d, the second transmission pawls 142, 142 being engaged with a pair of notches 144, 144 formed in the outer periphery of the friction clutch plate 87. With this, the aligning plate 138 connects the flange 42d and the friction clutch plate 87 in the rotating direction. In this case, minimum plays for allowing the tilting of the aligning plate 138 around the first and second axes y and z is provided between the respective corresponding transmission pawls 141, 142 and notches 143, 144.

The flywheel 72 has a boss 72a extending to the side opposite the cam mechanism 73, and a pressing ring 89 adapted to actuate the output lever mechanism 74 is mounted on the boss 72a through a release bearing 88 comprising a radial ball bearing.

The output lever mechanism 74 comprises a support shaft 90 projected from the inner end face of the outer casing 22b at an intermediate position between the axle 10 and the pressure discharge valve 20, and a lever 91 supported pivotally in an axial direction of the axle 10 at a neck 90a on the foremost end of the support shaft 90. The lever 91 comprises a long first arm 91a extending from the support shaft 90 while bypassing the output shaft 42 and a short second arm 91b extending from the support shaft 90 toward the pressure discharge valve 20, the first arm 91a being formed at its intermediate portion with an abutting portion 93, in the form of a crest, for abutment with the outer surface of the pressing ring 89.

A return spring 94 is compressed between the foremost end of the first arm 91 and the outer casing 22b, and the foremost end of the second arm 91b is arranged so as to be able to press the outer end of the valve body 67 of the pressure discharge valve 20.

The force of the return spring 94 acts on the lever 91 to press the abutment portion 93 of the first arm 91a against the pressing ring 89 and normally press the valve body 67 of the pressure discharge valve 20 to maintain its closed position. The pressing force received by the pressing ring 89 from the return spring 94 acts on the flywheel 72, the cam mechanism 73, the friction clutch plate 87 and the aligning plate 138 to urge these against the flange 42d whereby a force is applied to both the cam plates 82 and 83 so as to approach toward each other and a friction engaging force is applied to the friction clutch plate 87 and the driving cam plate 82.

The aforesaid friction engaging forces is set to such level that when the rotating torque in excess of a predetermined value acts between the friction clutch plate 87 and the flywheel 72, the friction clutch plate 87 gives rise to a slip.

A guide rod 85 extending through the return spring 94 and the levr 91 is fixedly mounted on the outer casing 22b to prevent falling of the return spring 94 and to control the pivotal route of the lever 91.

The support shaft 90 is designed as an adjustable type so that the fulcrum position of the lever 91 can be adjusted to assure the abutment state of the abutment portion 93 of the lever 91 against the pressing ring 89 and the closed state of the pressure discharge valve 20 by the second arm 91b. More specifically, the support shaft 90 has a thread portion 90b screwed into the outer casing 22b and projecting externally thereof, and a lock nut 92 is threadedly engaged with the outer end of the thread portion 90b. Accordingly, when the lock nut 92 is loosened and the thread portion 90b is turned suitably, the effective length of the support shaft 90 increases and decreases and therefore the position of the neck 90a thereof, i.e., the fulcrum position of the lever 91 can be adjusted. After the adjustment has been made, the lock nut 92 is fastened whereby the support shaft 90 is secured to the outer casing 22b.

The thread portion 90b and the lock nut 92 are faced externally of the casing 22 so that maintenance therefor can be easily performed by special tools. That is, the lock nut 92 is formed into a circular shape and is formed at its end with a tool groove 95 which can be merely engaged with a special screw driver that bypasses the outer end of the thread portion 90b. Tool groove 96 on the thread portion 90b can be a conventional one with which a conventioanl screw driver engages.

An O-ring 97 for sealing the outer casing 22b is attached to a portion of the support shaft 90 which extends through the outer casing 22b.

Figure 7:
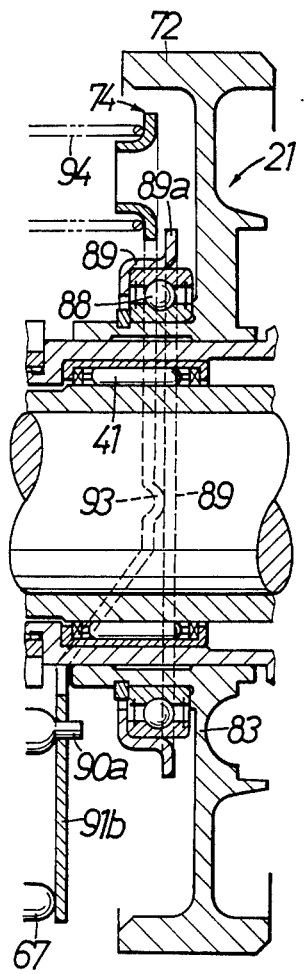
FIG. 7 is a longitudinal sectional view showing a modified example of a pressing ring of the wheel angular acceleration sensor.

If, as in a modified example shown in FIG. 7, the pressing ring 89 is formed at its inner end with an outwardly oriented flange 89a and an abutment portion 93 of the lever 91 is brought into abutment with the flange 89a, the spacing between the flywheel 72 and the lever 91 can be reduced to effectively make the sensor 21 compact.

Next, the operation of the above-described embodiment will be described. In mounting the antilock control device 7 on the front wheel 2f, one end of the cylindrical shaft 24 is fitted into the outer casing 22b which has already incorporated therein the hydraulic oil pressure pump 16, the modulator 17, the pressure discharge valve 20, the output lever mechanism 74 and the planetary gears $78_1, 78_2$. The output shaft 42 provided with the sun gear 79 is mounted on the cylindrical shaft 24, and the flywheel 72, the cam mechanism 73, the friction clutch plate 87, the aligning plate 138, etc. are mounted on the output shaft 42, after which the input member 75 is fitted into the other end of the cylindrical shaft 24 and the inner casing 22a is screwed to the outer casing 22b and thereafter the coupling plate 125 of the coupling 128 is fixed to the input member 75 by means of screws. In this manner, the antilock control device 7 is assembled as a single assembly separately from the front wheel 2f.

Then, when the cylindrical shaft 24 of the antilock control device 7 is fitted to the axle 10 supporting the hub 8 of the front wheel 2f and the device 7 is housed within the recess 8a of the hub 8, the engaging holes 126 of the coupling plate 125 are immediately engaged by the coupling pins 127 of the hub 8.

Thereafter, both ends of the axle 10 are secured to the lower ends of the pair of front forks 9, 9 by means of the holders 121 and bolts and nuts 122.

In the manner as described above, the assembling of the antilock control device 7 and the mounting of the device 7 on the front wheel 2f are easily carried out. Moreover, the axle 10 firmly supports the casing 22, and the hub 8 encases the principal parts of the device 7 in a compact manner.

During the travelling of the vehicle, the rotation of the front wheel $2f$ is transmitted to the input member 75 through the coupling 128 from the hub 8, and then to the output shaft 42 while being increased in speed by the ring gear 76, the first and second planetary gears $78_1$, $78_2$ and the sun gear 79, and transmitted to the flywheel 72 throught the first transmission pawls 141, the aligning plate 138, the second transmission pawls 142, the friction clutch plate 87 and the cam mechanism 73 from the flange $42d$ and therefore, the flywheel 72 is rotated at a higher speed than the front wheel $2f$. Thus, the flywheel 72 is able to have a great rotational inertia force. At that time, even if the pressing ring 89 and the lever 91 are in abutment with each other, the rotation of the flywheel 72 is not at all impaired by the lever 91 due to the provision of the release bearing 88.

At the same time, the cam shaft 26 and the speedometer 51 are also driven by the rotation of the first planetary gear $78_1$.

If an overload is being applied to the input member 75 for some reason during the driving as described above, the coupling pins 127 of the coupling 128 are sheared to cut off the transmission from the hub 8 to the input member 75, and therefore it is possible to prevent the accelerating gear unit 45 or the sensor 21 from suffering from overload.

When the front master cylinder $5f$ is operated to brake the front wheel $2f$, the output oil pressure thereof is transmitted to the front wheel brakes $3f$, $3f$ through the upsteam pipe $15a$ of the hydraulic oil pressure conduit 15, the hydraulic oil pressure chamber 36 of the hydraulic oil pressure pump 16, the input hydraulic oil pressure chamber 54 of the modulator 17, the valve chamber 58, the valve hole 59, the output hydraulic oil pressure chamber 55 and the downstream pipe $15b$ of the hydraulic oil pressure conduit 15 in said order, actuating these to apply a braking force to the front wheel $2f$.

On the other hand, in the hydraulic oil pressure pump 16, since the output oil pressure of the front master cylinder $5f$ is introduced into the hydraulic oil pressure chamber 36, the pressing action of said hydraulic oil pressure on the operating piston 29 and the lifting action of the eccentric cam $26a$ on the push rod 27 cause the reciprocating action of the pump piston 28. Then, in the suction stroke in which the pump piston 28 moves toward the push rod 27, the intake valve 38 is opened so that oil in the oil tank 19 is taken into the pump chamber 35 through the inlet chamber 31 from the conduit 37. In the exhaust stroke in which the pump piston 28 moves toward the operating piston 29, the one-way seal member 39 deforms to open the valve so that the oil in the pump chamber 35 is fed under pressure to the outlet chamber 32 and further to the control hydraulic pressure chamber 18 of the modulator 17 through the oil passage 57. Then, when the pressure in the outlet chamber 32 and the control hydraulic oil pressure chamber 18 increases to a predetermined value, the pump piston 28 is held at the position in abutment with the plug 34 due to the pressure of the outlet chamber 32.

Incidentally, since the control hydraulic oil pressure chamber 18 of the modulator 17 has originally been cut off its communication with the oil tank 19 by the closing of the pressure discharge valve 20, oil pressure supplied to the chamber 18 from the pump 16 directly exerts on the pressure reducing pistion 46 to urge the piston toward a retracted position, and the valve body 60 is held in the open state by the valve opening rod 62 to allow passage of output oil pressure from the front master cylinder $5f$.

Accordingly, in a normal braking state, the braking force applied to the front wheel brakes $3f$, $3f$ is proportional to the output oil pressure of the front master cylinder $5f$.

When an angular deceleration occurs in the front wheel $2f$ following the braking operation, the flywheel 72 which has sensed such angular deceleration is caused to make overrun rotation with respect to the output shaft 42 due to the inertia force thereof. The angular moment of the flywheel 72 at that time gives rise to a relative rotation between the cam plates 82, 83, and the flywheel 72 is subjected to axial displacement due to the thrust generated by the rolling of the thrust balls 84 whereby the pressing ring 89 is caused to forcibly move the lever 91. However, in a stage where no possibility is present to lock the front wheel $2f$, the angular deceleration of the front wheel $2f$ is so low as not to oscillate the lever 91.

However, when the front wheel $2f$ is about to lock due to an excessively great braking force or lowering in coefficient of friction of the road surface, the angular deceleration of the front wheel $2f$ rapidly increases to exceed a predetermined value so that the pressing force of the pressing ring 89 exceeds a set level and the lever 91 oscillates around the support shaft 90 while compressing the return spring 94. Therefore, the second arm $91b$ of the lever 91 oscillates so as to move away from the valve body 67, as a result of which the pressure discharge valve 20 assumes an open position.

When, after the flywheel 72 has been displaced axially, the rotating torque due to the inertia of the flywheel 72 exceeds a predetermined transmission torque of the friction clutch plate 87, a slip occurs between the driving cam plate 82 and the friction clutch palte 87 and the flywheel 72 continues its overrun rotation with respect to the output shaft 42 whereby the overload can be prevented from acting on the cam mechanism 73 and the like.

Incidentally, when, at the time of the thrust being generated due to the relative rotation of the driving and driven cam plates 82, 83, an unbalanced load is exerted between both the cam plates 82, 83 due to any machining error in the plurality of cam recessed portions $82a$, $83a$ and the thrust balls 84, etc., three members of the driving cam plate 82, the friction clutch plate 87 and the aligning plate 138 unitarily tilt around the first axis y on the abutment point between the first fulcrum projections 139, 139 of the aligning plate 138 and the flange $42d$ of the output shaft 42, or two members, the driving cam plate 82 and the friction clutch plate 87, unitarily tilt around the second axis z on the abutment point between the second fulcrum projections 140, 140 of the aligning plate 138 and the friction clutch plate 87, whereby such unbalanced load can be immediately corrected into a proper thrust load acting along the axis x of the output shaft 42. Thus, the axial displacement of the flywheel 72, that is, its sliding can be carried out smoothly, and in addition, the frictional engaging force between the friction clutch plate 87 and the driving cam plate 82 can be uniformly controlled at any parts to stabilize the slip characteristic of the friction clutch plate 87.

When the pressure discharge valve 20 is opened, oil pressure of the control oil chamber 18 is discharged to the oil tank 19 through the oil passage 70, the inlet chamber 68, the valve hole 66, the outlet chamber 69, the oil passage 71, the inlet chamber 31 of the hydraulic oil pressure pump 16 and the conduit 37, and therefore, the pressure reducing piston 46 is moved toward the control hydraulic oil pressure chamber 18 against the force of the return spring 48 due to the oil pressure in the output hydrualic oil pressure chamber 55 to thereby withdraw the valve opening rod 62. The valve body 60 shifts to the closed side to interrupt communication between the input and output oil chambers 54, 55 and increase the volume of the output hydraulic oil pressure chamber 55. As the result, the braking oil pressure acting on the front wheel brakes 3f, 3f lowers to reduce the braking force of the front wheel 2f, thus avoiding the locking phenomenon of the front wheel 2f. Then, since the pressing force of the pressing ring 89 to the lever 91 is released as the rotation of the front wheel 2f accelerates, the lever 91 pivots and returns to its original position with the repulsion force of the return spring 94 to close the pressure discharge valve 20. When the valve 20 is closed, the pressure oil discharged from the hydraulic oil prssure pump 16 is immediately sealed in the control hydraulic oil pressure chamber 18 whereby the pressure reducing piston 46 is moved back toward the output hydraulic oil pressure chamber 55 to increase pressure in the chamber 55 to restore the braking force. Such operation is repeatedly carried out at high speeds, whereby the front wheel 2f can be braked efficiently.

Figure 8:
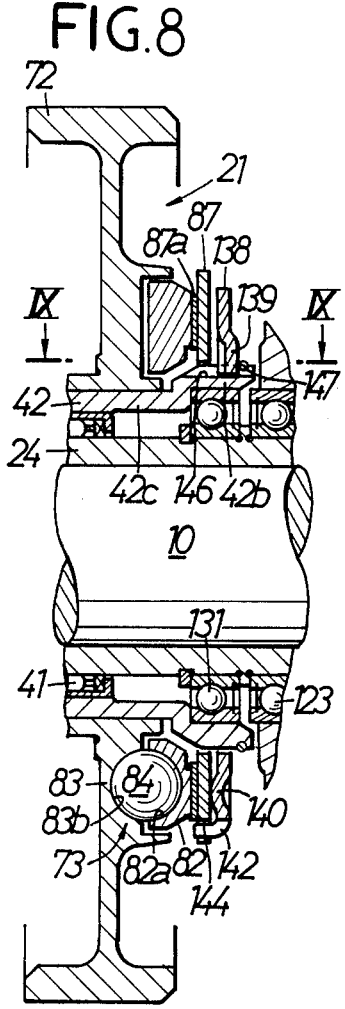

FIGS. 8 through 10 show a second embodiment according to the present invention, which is different from the previous embodiment in the connecting construction between the output shaft 42 and the aligning plate 138.

More specifically, the annular aligning plate 138 is formed with a pair of semi-circular cylindrical first fulcrum projections 139, 139 projecting in a radially center direction from the inner peripheral edge along the first axis y. These projections are engaged with recessed grooves 146, 146 formed on the outer peripheral surface of the larger diameter end portion 42d of the output shaft 42 to extend along the axis of shaft 42. The first fulcrum projections 139 each has a cylindrical surface placed in abutment with a stop ring 147 of a circular section which is secured to the outer periphery of the large diameter portion 42b so as to transverse the recessed grooves 146, 146. Thus axial movement of the plate 138 is limited by abutment against the ring 147.

It is to be noted in this case that if an axial dead end is provided at one end of each of the recessed grooves 146, 146 and the first fulcrum projections 139,139 are supported by them, the aforesaid stop ring 147 can be omitted. This construction is realized by the fourth embodiment of FIGS. 12-18 to be described later.

According to the second embodiment, the rotating torque of the output shaft 42 can be transmitted to the aligning plate 138 through the frist fulcrum projections 139, 139, and the aligning plate 138 can be tilted around the first axis y on the abutment point between the first fulcrum projections 139, 139 and the stop ring 147. Accordingly, the first fulcrum projections 139, 139 are also to have the function of the first transmission pawls 141, 141 of the first embodiment. Therefore, the flange 42d in the first embodiment can be deleted to effectively simplify the construction.

Other structures in the second embodiment are similar to those of the first embodiment, and parts in the former corresponding to those of the first embodiment are indicated by the same reference numerals.

Figure 11:
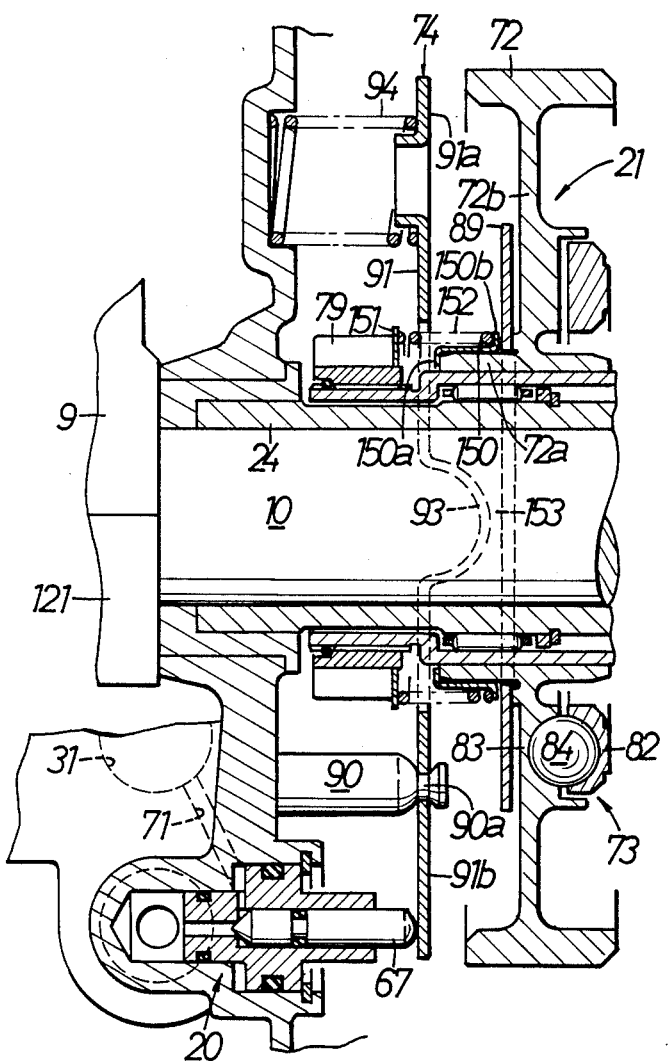
FIG. 11 shows a third embodiment of the present invention and is a longitudinal sectional view of essential parts of the wheel angular acceleration sensor.
Figure 12:
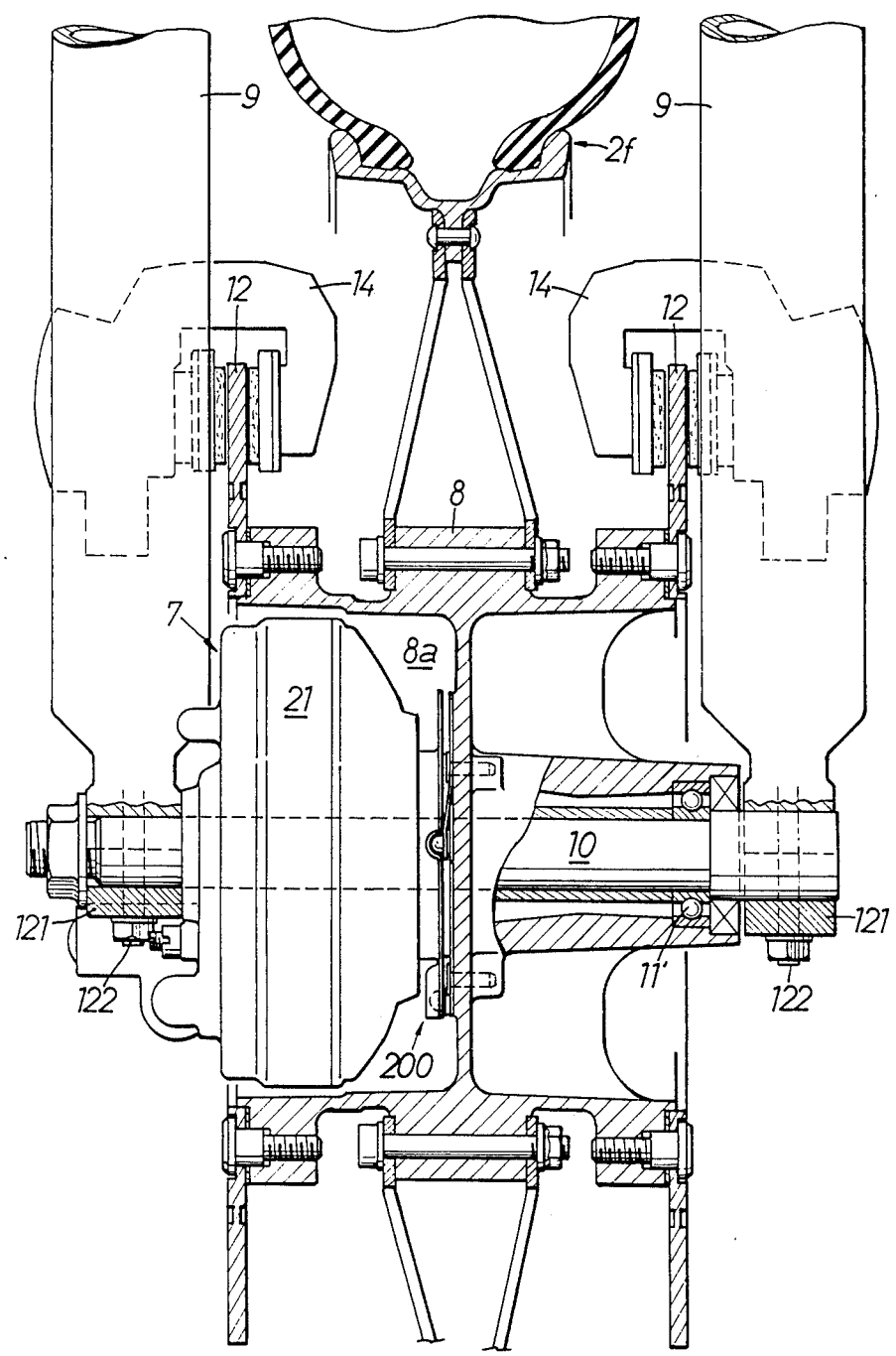

FIG. 11 shows a third embodiment according to the present invention, which is different from the first embodiment in that the pressing ring 89 and the lever 91 are normally held in a non-contact state.

More specifically, a cylindrical retainer 150 is fitted to the boss 72a of the flywheel 72 projected on the side of the sun gear 79, the retainer 150 having at the outer end thereof a radially inwardly oriented flange 150a abutting against the end face of the boss 72a. Between the outwardly oriented flange 150b formed at the inner end of the retainer 150 and the seat plate 150 superposed on the end of the sun gear 79 is compressed a return spring 152 for the flywheel 72, the resilient force of the return spring 152 urging the flywheel 72 always toward the cam mechanism 73 through the retainer 150.

The pressing ring 89 is relatively rotatably fitted around the boss 72a between the outwardly oriented flange 150b of the retainer 150 and the disk portion 72b of the flywheel 72, and a predetermined small spacing 153 is normally formed between the pressing ring 89 and the lever 91 of the output lever mechanism 74.

When the thrust is applied to the flywheel 72 by the operation of the cam mechanism 73, the flywheel 72 is moved leftward, and the pressing ring 89 comes into abutment with the abutment portion 93 of the lever 91 to forcibly move the lever 91.

According to this embodiment, the non-contact state between the pressing ring 89 and the lever 91 is normally maintained, and therefore, the flywheel 72 can be rotated without being resisted by the lever 91 even if no release bearing is provided between the flywheel 72 and the pressing ring 89. The return spring 152 for the flywheel 72 can be ensured a sufficient length to set its spring constant small, and in addition, the boss 72a of the flywheel 72 can have a sufficient length to stabilize the sliding of the flywheel 72.

Other structures in this embodiment are substantially similar to those of the first embodiment, and parts in this embodiment corresponding to those of the first embodiment are indicated at the same reference numerals.

FIGS. 12 through 18 show a fourth embodiment of the present invention, which is different from the above-described first embodiment in the construction of a coupling for connecting the hub 8 with the input member 75, in the construction of an aligning plate and associated elements, and in the construction to support the flywheel 72 on the output shaft 42.

More accurately, in the fourth embodiment, the boss 75a of the input member 75 projected integrally from the center of the end wall to the hub side is connected to the hub 8 of the front wheel 2f through a coupling 200.

Figure 13:
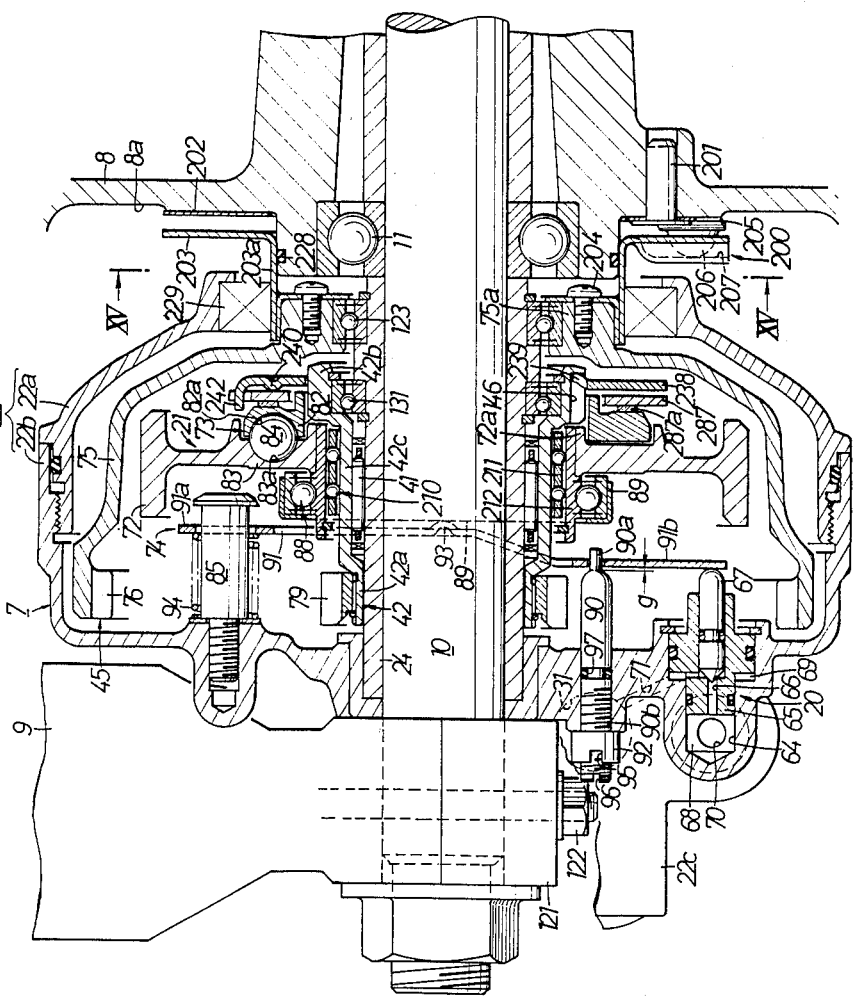
Figure 14:
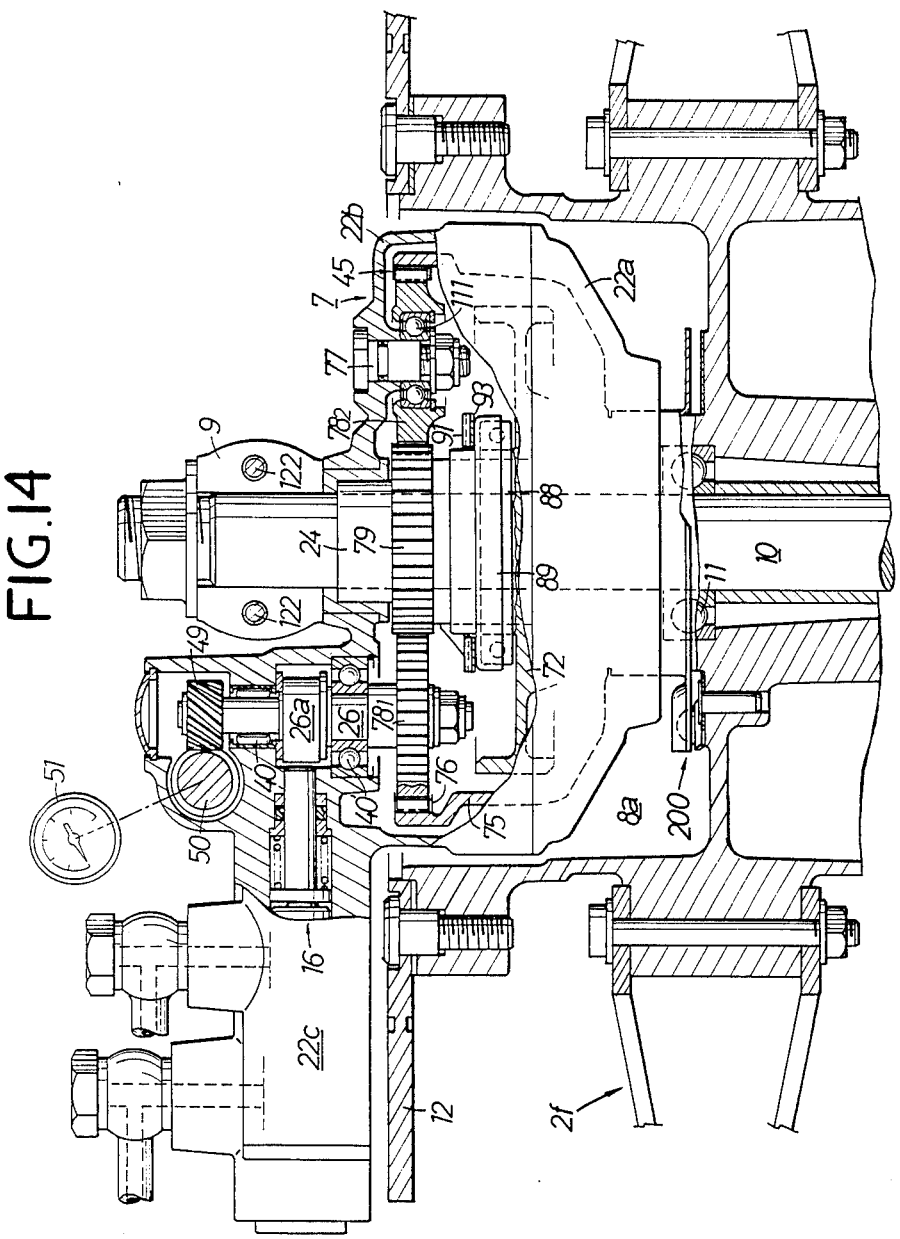
Figure 15:
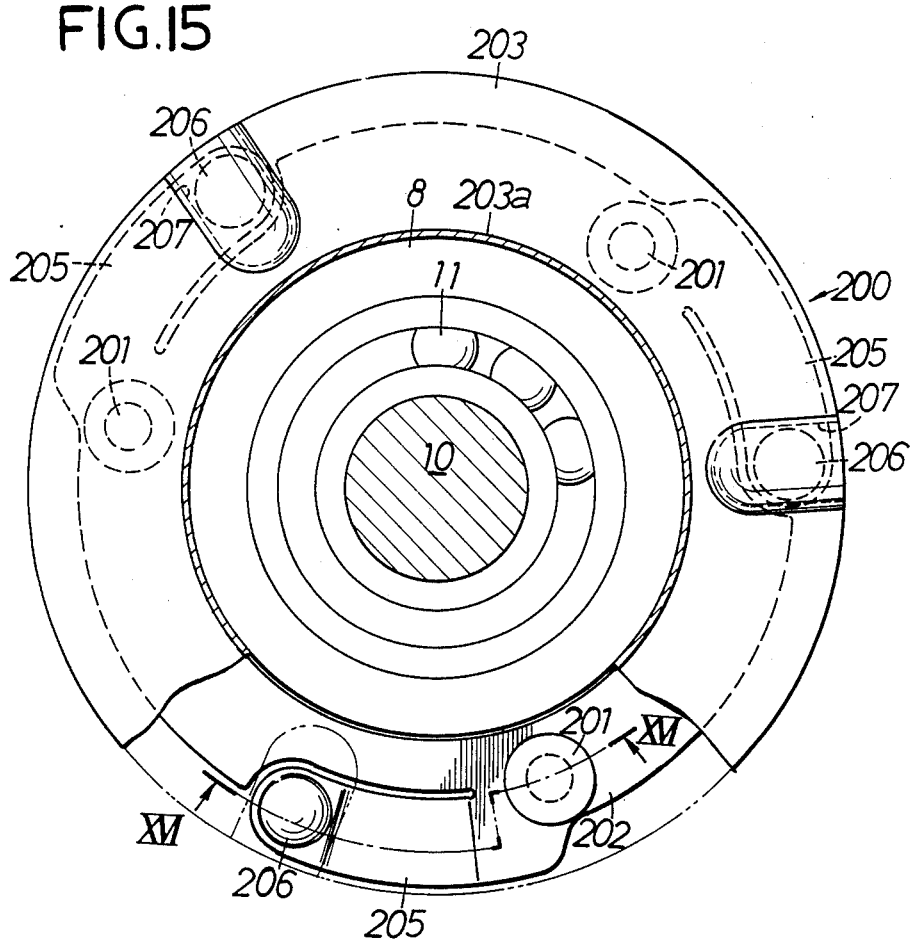
Figure 16:
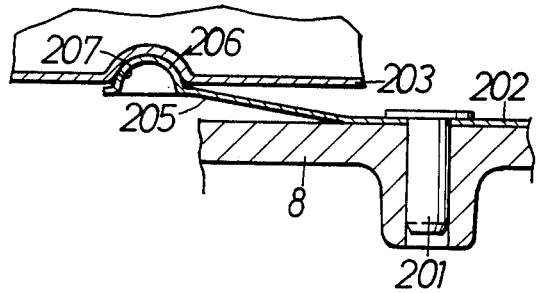

As shwon in FIGS. 13, 15 and 16, the coupling 200 comprises a driving coupling plate 202 secured to the end face of the hub 8 by means of a plurality of pressure pins 201 and a driven coupling plate 203 secured to the end face of the boss 75a of the flywheel 75 by means of a plurality of bolts 204. The driving coupling plate 202 is provided with a plurality of transmission tongues 205, 205, ... which are cut-erected toward the driven coupling plate 203 to extend in the circumferential direction and which are given resiliency. Each of said transmission tongues 205 is formed at one end thereof with a semispherical convex portion 206 protruded toward the driven coupling plate 203. On the other hand, the driven coupling plate 203 is formed with a plurality of concave portions 207, 207, ... which extend radially on the surface opposed to the driving coupling plate 202, said convex portions 206, 206, . . . being resiliently engaged in said concave portions 207, 207, . . . respectively. Thus, when an excessively great torque is applied between both the coupling plates 202 and 203, the covex portions 206, 206, . . . are disengaged from the concave portions 207, 207, . . . against the spring force of the transmission tongues 205 to release the connection between both the coupling plates 202 and 203 to prevent the transmission of an excessively great torque.

The driven coupling plate 203 has a boss 203a fitted on the outer peripheries of the boss 75a and hub 8, and the interior of the casing 22 is closed by seal members 228 and 229 interposed between the boss 203a and the hub 8 and inner case 22a.

Turning again to FIG. 13, the output shaft 42 comprises a small diameter end portion 42a spline-connected to a sun gear 79, a large diameter end portion 42b on an opposite side to the portion 42a, a shaft portion 42c for connecting these end portions 42a and 42b, the output shaft 42 having no flange 42d provided in the first embodiment. The small diameter end portion 42a is arranged directed toward the outer case 22b, and the shaft portion 42c and the large diameter end portion 42b are rotatably supported on the cylindrical shaft 24 through the needle bearing 41 and ball bearing 131, respectively.

The flywheel 72 is rotatably and slidably supported on the shaft portion 42c through a slide type ball bearing 210. The ball bearing 210 comprises a retainer 211 for retaining a number of balls in plural rows and an outer race 212, said outer race 212 being press-fitted into the boss 72a of the flywheel 72. The flywheel 72 is connected to the large diameter end portion 42b of the output shaft 42 through the cam mechanism 73, a friction clutch plate 287 and an aligning plate 238.

Figure 17:
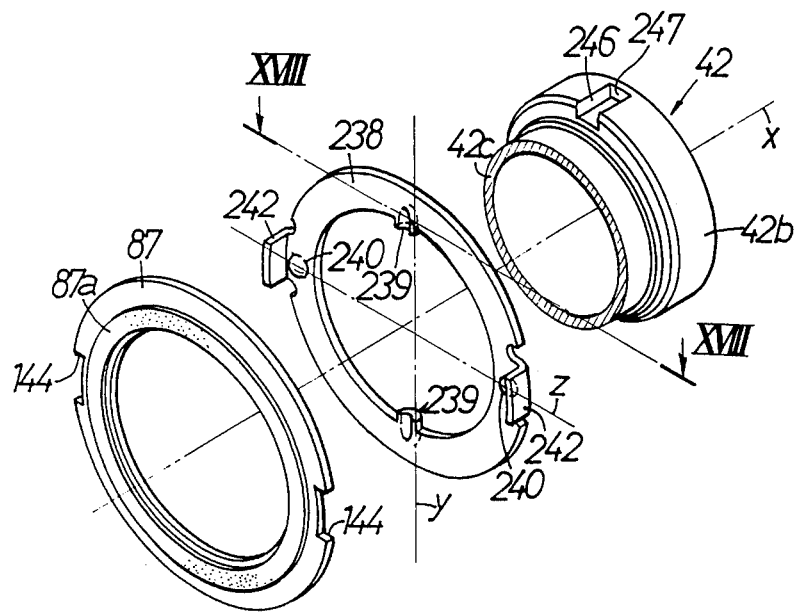
Figure 18:
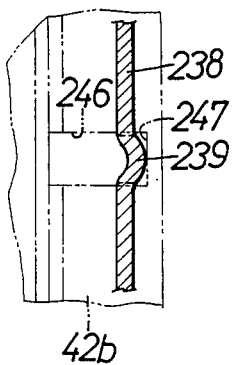

The annular aligning plate 238 has, as shown in FIG. 17, the same construction as that of the aligning plate 138 of the second embodiment shown in FIG. 10. More specifically, the aligning plate 238 is provided with a pair of semicylindrical first fulcrum projections 239, 239 to enable the tilting of the aligning plate 238 around a first axis y perpendicularly crossing an axis x of the output shaft 42, a pair of semi-cylindrical second fulcrum projections 240, 240 to enable the tilting of the aligning plate 238 around a second axis z perpendicularly crossing the axes x and y, respectively, and a pair of transmission pawls 242, 242 in engagement with a pair of notches 144, 144 formed in the outer periphery of the friction clutch plate 87.

On the other hand, a pair of recessed grooves 246, 246 formed in the outer peripheral surface of the large diameter end portion 42b of the output shaft 42 each has an axial dead end 247, the first fulcrum projection 239 of the aligning plate 238 being engaged with the dead end 247.

In FIG. 13, the outer race 212 of the slide type ball bearing 210 projects lengthwise from the boss 72a of the flywheel 72 to the side opposite the cam mechanism 73 in the axial direction, and a release bearing 88 whose inner race is formed by said projecting outer race of bearing 210 is provided adjacent to the flywheel 72.

A pressing ring 89 adapted to actuate the output lever mechanism 74 is fitted around the outer periphery of the outer race of the release bearing 88.

In this embodiment, the lever 91 of the output lever mechanism 74 has an appropriate gap g given against the fulcrum portion on the support shaft 90, i.e., the base portion of the neck 90a in order to secure the state of abutment with the pressing ring 89 by the abutting portion 93 of the level 91 and the closed state of the pressure discharge valve 20 caused by the second arm 91b.

Accordingly, in the fourth embodiment, since the flywheel 72 is supported on the output shaft 42 through the slide type ball bearing 210, rotation and sliding movement thereof on the output shaft 42 are effected very smoothly, so that the operating characteristic thereof remains almost unchanged even if the lubricating state should be varied, thus making it possible to precisely respond to certain angular deceleration speed of the front wheel 2f.

What is claimed is:

1. A wheel angular acceleration sensor for a vehicle anti-lock control device comprising an output shaft rotated in association with a wheel braked by a wheel brake, a flywheel rotatably and slidably supported on the output shaft, a friction clutch plate which is interposed between the output shaft and the flywheel and normally transmits a driving torque of the output shaft to the flywheel, the clutch plate allowing overrun rotation of the flywheel when the wheel is about to lock at braking, and a cam mechanism interposed in series with said friction clutch plate between said output shaft and said flywheel so as to be responsive to the overrun rotation of the flywheel to impart axial displacement to the flywheel, said axial displacement of the flywheel being outputted as a control signal for a braking force of the wheel brake, wherein between the output shaft and the friction clutch plate is interposed an aligning plate for connecting the output shaft and the friction clutch plate in a rotating direction, said aligning plate having opposite sides and being provided at one side with a pair of first fulcrum projections placed in abutment with the output shaft to enable titling motion of said aligning plate around a first axis perpendicularly crossing an axis of the output shaft and at the other side with a pair of second fulcrum projections in abutment with the friction clutch plate to enable tilting motion of said aligning plate around a second axis perpendicularly crossing both the axis of the output shaft and the first axis.

2. The wheel angular acceleration sensor according to claim 1, wherein transmission pawls and notches, which are engaged with each other, are provided in the aligning plate and the output shaft, and in the aligning plate and the frciton clutch plate in order to connect the aligning plate to the output shaft and the friction clutch plate in the rotating direction.

3. The wheel angular acceleration sensor according to claim 1, wherein said output shaft has a flange integral therewith, said flange extending radially and opposing to the one side of said aligning plate.

4. The wheel angular acceleration sensor according to claim 1, wherein between said aligning plate and said output shaft, and between said aligning plate and said friction clutch plate, means for connecting them in the rotating direction are provided.

5. The wheel angular acceleration sensor according to claim 4, wherein each of said first fulcrum projections is projected radially from the aligning plate and engaged with an axial recessed groove provided on said output shaft, said first fulcrum projection being used also as said conencting means between the aligning plate and the output shaft.

6. The wheel angular acceleration sensor according to claim 5, wherein said output shaft is provided with means for limiting axial movement of the first fulcrum projection of said aligning plate in the recessed groove.

7. The wheel angular acceleration sensor according to claim 1, wherein a slide type ball bearing is interposed between said output shaft and said flywheel.

8. The wheel angular acceleration sensor according to claim 1, wherein between said wheel and an input member for transmitting the rotation of said wheel to said output shaft is interposed a coupling for connecting said wheel and input member in the rotational direction and for preventing transmission of a rotating torque in excess of a predetermined value from the wheel to the input member.

9. The wheel angular acceleration sensor according to claim 8, wherein said coupling has a convex portion provided on one of the wheel and the input member and a concave portion provided on the other and brought into resilient engagement with said convex portion, said convex portion and said concave portion being disconnected from each other by the action of torque in excess of said predetermined value.

10. The wheel angular acceleration sensor according to claim 8, wherein said coupling comprises a coupling plate provided on one of the wheel and the input member and formed with a plurality of engaging holes on a circumference, and a plurality of coupling pins implanted to the other and being fitted in said engaging holes, said coupling pins being sheared upon receipt of torque in excess of said predetermined value.

11. The wheel angular acceleration sensor according to claim 2, wherein said output shaft has a flange integral therewith, said flange extending radially and opposing to the one side of said aligning plate.

* * * * *